(12) United States Patent
Matt et al.

(10) Patent No.: US 9,457,375 B2
(45) Date of Patent: Oct. 4, 2016

(54) DECORATIVE COLORED PARTICLE DISPERSION FOR USE IN SURFACE COATING COMPOSITIONS AND METHOD FOR MAKING SAME

(75) Inventors: Michael Matt, Phoenix, AZ (US); Luis Hernandez, Mesa, AZ (US); Darrell Sharon, Surprise, AZ (US)

(73) Assignee: CHIPS UNLIMITED, INC., Tempe, AZ (US)

( * ) Notice: Subject to any disclaimer, the term of this patent is extended or adjusted under 35 U.S.C. 154(b) by 1161 days.

(21) Appl. No.: 13/015,189

(22) Filed: Jan. 27, 2011

(65) Prior Publication Data

US 2011/0189391 A1 Aug. 4, 2011

Related U.S. Application Data

(60) Provisional application No. 61/300,407, filed on Feb. 1, 2010.

(51) Int. Cl.
*B05D 1/38* (2006.01)
*C08L 63/00* (2006.01)

(52) U.S. Cl.
CPC *B05D 1/38* (2013.01); *C08L 63/00* (2013.01)

(58) Field of Classification Search
CPC .................................. C08L 63/00; B05D 1/38

USPC .......................................................... 524/560
See application file for complete search history.

(56) References Cited

U.S. PATENT DOCUMENTS

| | | | |
|---|---|---|---|
| 4,607,066 A * | 8/1986 | Barry ...................... | E21D 11/38 166/294 |
| 4,980,400 A | 12/1990 | Sessa et al. | |
| 5,013,629 A * | 5/1991 | Sekine et al. .................. | 430/138 |
| 5,665,137 A * | 9/1997 | Huang ........................ | 65/134.1 |
| 6,300,407 B1 * | 10/2001 | Machleder et al. .......... | 524/515 |
| 6,607,818 B1 | 8/2003 | Satz et al. | |
| 6,649,257 B1 | 11/2003 | Satz | |
| 2008/0257477 A1* | 10/2008 | Kwak .............................. | 156/98 |
| 2009/0151603 A1* | 6/2009 | Francis ......................... | 106/675 |
| 2009/0206352 A1* | 8/2009 | Becker et al. .................. | 257/98 |

* cited by examiner

*Primary Examiner* — Alexander Kollias
(74) *Attorney, Agent, or Firm* — Snell & Wilmer L.L.P.

(57) ABSTRACT

The present disclosure generally relates to various composite slurries for use in seamless surface coverings and various methods for making the same. In particular, the present disclosure teaches various composite slurry compositions comprising, for example, a clear hardening material, a plurality of particles, a stabilizing filler, and an aggregate. Additionally, the present disclosure teaches various methods of forming composite slurry compositions for use in seamless surface coverings.

12 Claims, No Drawings

DECORATIVE COLORED PARTICLE DISPERSION FOR USE IN SURFACE COATING COMPOSITIONS AND METHOD FOR MAKING SAME

CROSS REFERENCE TO RELATED APPLICATIONS

This application is a nonprovisional application of and claims priority to U.S. Patent Application No. 61/300,407, filed Feb. 1, 2010, and entitled, "DECORATIVE COLORED PARTICLE DISPERSION FOR USE IN SURFACE COATING COMPOSITIONS AND METHOD FOR MAKING SAME." The contents of the '407 application are incorporated by reference herein in their entirety.

FIELD

The present disclosure generally relates to various composite slurries for use in seamless surface coverings and methods for making the same. In particular, the present disclosure teaches various composite slurry compositions comprising, for example, a clear hardening material, at least one particle, a stabilizing filler, and an aggregate. Additionally, the present disclosure teaches various methods of forming composite slurry compositions for use in seamless surface coverings comprising, for example, creating an admixture of dry ingredients comprising at least one particle, a stabilizing filler, and an aggregate, and mixing said admixture with a clear hardening material.

BACKGROUND

Chemical surface covering materials may be used for flooring and provide a clean, seamless solution for flooring found in residential, commercial and industrial areas. Currently, both commercially and residentially, there are many different types of chemical surface covering materials that yield a seamless surface on a substrate. Chemical surface covering materials may be used on a variety of substrates, such as concrete, wood, and the like. These chemical surface covering materials typically consist of a clear hardening material and a group of particles. Most commonly, the clear hardening material, such as polyester, urethane, or epoxy compounds, is applied in viscous form to a substrate. Then, a group of particles is broadcast or distributed on top of the clear hardening material, and the coating is allowed to cure. Once cured, the resultant surface covering is nearly or completely seamless.

As will be discussed below, such surface coating systems are typically applied by a trowel, a roller, or a squeegee. Unfortunately, current chemical surface covering materials require that the particles be dispersed after the hardening material has been applied to the substrate. This is typically done by hand and results in non-uniform distribution of particles across the x, y and z axes of the coated surface due to diffusion limitations. Thus, there is a need for a composite slurry composition for use in seamless surface coverings that provides for uniform particle distribution and allows for a more efficient installation process.

SUMMARY

The present disclosure generally relates to various composite slurries for use in seamless surface coverings and various methods for making the same. In particular, a composition is provided comprising a clear hardening material, a plurality of particles, a stabilizing filler, and an aggregate configured to cooperate with said stabilizing filler to provide uniform suspension of said plurality of particles.

Further, a method is provided comprising creating an admixture of dry ingredients comprising a plurality of particles, a stabilizing filler, and an aggregate, mixing said admixture with a polymeric material to form a precursor composite slurry having a uniform suspension of said particle.

In various embodiments, the composite slurry for use in seamless surface coverings comprises a clear (non-pigmented) hardening material having an activated viscosity of about 300 CP to about 800 CP, a plurality of particles, a stabilizing filler, and an aggregate.

In various embodiments, the method of forming a composite slurry composition for use in seamless surface coverings comprises mixing together a clear (non-pigmented) polymeric liquid, a plurality of particles, a stabilizing filler, and an aggregate that cooperate to provide a slurry of homogenously suspended solids that flow uniformly in a cohesive manner when applied to a surface.

Accordingly, in various embodiments, the slurry is uniformly distributed over a desired surface area of application with simple tools (such as a notched trowel, a notched squeegee, or a gauge rake) to produce a self-leveling, uniform coating, whereby the particles substantially cover the substrate to conceal the underlying surface and may provide a uniform decorative effect having a granulate appearance and a smooth surface profile.

These and other advantages of the composite materials and methods for making the same according to various aspects and embodiments of the present invention will be apparent to those skilled in the art upon reading and understanding the following detailed description.

DETAILED DESCRIPTION OF THE INVENTION

The present disclosure provides a composition wherein one or more of the composition's constituent components cooperate to resist sedimentary forces that cause an irregular deposition of material when distributed over a surface, even large surfaces. Thus, in various embodiments, the compositions described herein provide composite slurry that is easy to apply and produces a smooth surface finish when cured.

In various embodiments, the disclosed composite slurry has a high ratio of solids to liquids, yet flows readily when distributed to produce a uniform, self-leveling coating. The resulting coating thickness tends to be sufficient to cover imperfections (divots, cracks, protrusions) in the underlying substrate. An exemplary coating thickness may range from about 40 mils to about 90 mils. Furthermore, the liquid film cures in-situ to produce a coating having enhanced durability, compression strength, ability to dissipate heat, and decreased permeability.

Without limiting the scope of the present disclosure, the various embodiments of composite slurries and methods described herein may be used to create architectural panels, tiles, wall coverings, and casting of ornamental objects. In addition, in various embodiments, the composite slurries and methods described herein may be used to create a decorative load bearing sandwich structure having an inner core (e.g., foam) encompassed between an outer structure load bearing membrane. One example of this application is demonstrated by the construction of a surfboard.

In various embodiments, the crystalline structure of the aggregate and the stabilizing filler are sufficiently transparent when wetted by the clear hardening material such that the resulting composition remains substantially transmissive to visible light, thus allowing the particles to visually project through the resulting composition to produce a homogenous, uniformly distributed granulate appearance when viewed from above. For example, the aggregate and the stabilizing filler may have a refractive index ranging between 1.5 and 1.6 when wetted by the clear hardening material. The clear hardening material may be tinted to transmit certain colors, though still remaining substantially transmissive to visible light. In further embodiments, however, the clear hardening material may be opaque or translucent during application and may cure to be at least partially transmissive to visible light.

Additionally, in an various embodiments, the combination of solids (e.g., a plurality of particles, a stabilizing filler, and an aggregate) produce an admixture that is proportioned to facilitate combining with the clear hardening material with simple volume ratios to minimize complexity of on-site (in-the-field) mixing and installation. In an various embodiments, desired results have been produced with mixtures (volume ratio of admixture to clear hardening material) ranging from about 0.5:1.0 to about 1.5:1.0, from about 0.75:1.0 to about 1.25:1.0, and about 1:1 (volume:volume).

Stabilizing Filler

Solid materials may negatively affect a chemical surface covering material's ability to transmit visible light and/or selectively transmit only particular colors. For example, conventionally used solid materials may add a white or gray hue ("cloudy" or "milky" contamination) to a resulting composite slurry and degrade the decorative impact of the particles included in the mixture. Thus, various embodiments, the stabilizing filler may comprise any stabilizing filler that does not negatively affect visible light transmission clarity or otherwise degrade the impact of the particles included in the mixture.

In various embodiments, the stabilizing filler may comprise micro-glass milled fiber. In particular, in further embodiments, the fiber is a man-made material composition comprising of silica oxide, calcium, aluminum, magnesium, and boron fused in an amorphous vitreous state.

In various embodiments, the preferred average fiber diameter is about 10 microns to about 20 microns. More preferably, in various embodiments, the average fiber diameter may be about 16 microns. Additionally, in various embodiments, the average fiber length is from about 100 microns to about 300 microns. The average fiber length is about 220 microns in various embodiments.

In various embodiments, the average fiber aspect ratio is about 10:1 to about 20:1, though in further embodiments the average fiber aspect ratio is about 14:1.

Smaller fibers may also be used by adjusting the relative ratio of particles and aggregate to produce the desired flow, self-leveling characteristics, and post-cure surface profile. One example of an alternative stabilizing filler is micro-glass milled fiber having an average fiber diameter of 16 microns and an average fiber length of 150 microns, yielding an average aspect ratio of 11:1.

In various embodiments, the stabilizing filler is micro-glass milled fiber as disclosed above comprising silica oxide, calcium, aluminum, magnesium and boron, combined with vitreous calcium aluminosilicate. Vitreous calcium aluminosilicate is typically manufactured by heating a blend of ground silica, lime, and alumina compounds to a molten state which is then solidified by quench cooling and ground to a fine powder with a specific gravity of 2.6, a hardness of 5.5 Mohs, and a refractive index of 1.56.

Additionally, in various embodiments, vitreous calcium aluminosilicate may be added as a stabilizing filler in a powder form that is finer than other stabilizing components so as to reduce surface imperfections of the resulting coating. A reduction of surface imperfections results as vitreous calcium aluminosilicate particles disperse in both solid and dissolved forms within a clear polymeric material (e.g., a synthetic resin) during the mixing, placement, and curing process. Furthermore, vitreous calcium aluminosilicate is a certified 100% post industrial recycled product that will contribute points to the U.S. Green Building Council's Leadership in Energy and Environmental Design (LEED) certification for building sustainable structures.

In various embodiments, a stabilizing particle may be added as a stabilizing filler to enhance fluid flow due to added cohesiveness of particles in the resulting mixture, which provides improved compression strength, decreased permeability, and increased durability. In various embodiments, the stabilizing particle may comprise a particle ranging between about 10 and about 20 microns (with 95% passing through no. 325 mesh) in size. Additionally, in various embodiments, the stabilizing particle may comprise any structure or chemical species capable of or configured to transmit ultraviolet light. This is particularly useful for use with clear hardening materials that can be cured by exposure to ultraviolet light.

In various embodiments, materials that may be used as stabilizing filler include substances with particle morphologies of fibers or platelets having an average particle size ranging between about 5 microns and about 30 microns. These substances include, but are not limited to, Wollastonite, 1250 Novacite®, Daper Novacite®, silica flour, mica, alumina, and calcium carbonate. In general, hardness of these alternative stabilizing fillers range between 3 Mohs and 8 Mohs, and specific gravities range between 2.5 and 2.9. As a result, use of these stabilizing fillers requires a corresponding adjustment of respective mixing ratios to produce acceptable flow and self-leveling characteristics.

Aggregrate

As mentioned above, various embodiments include an aggregate that cooperates with the particles and/or stabilizing filler to provide a composite slurry with predictable clarity, flow, and self-leveling characteristics.

In various embodiments, the aggregate may comprise a sub-round microcrystalline silica produced from industrial quartz having a specific gravity of about 2.65 and a hardness of about 7 Mohs. In various embodiments, an aggregate comprises microcrystalline silica having a high chemical purity that principally comprises silicon dioxide ($SiO_2$) and has a uniform particle size distribution. Moreover, in various embodiments, the aggregate has a refractive index such that it does not negatively affect the visual properties of the composite slurry, such as the composite slurry's ability to transmit visible light. For example, an aggregate may have a refractive index ranging from about 1.5 to about 1.6.

In various embodiments, an aggregate comprising microcrystalline silica is used having a composition profile as follows:

| TYPICAL COMPOSITION PROFILE Mean Percentage by Weight | |
|---|---|
| Silicon Dioxide ($SiO_2$) | 99.726 |
| Iron Oxide ($Fe_2O_3$) | 0.021 |
| Aluminum Oxide ($Al_2O_3$) | 0.067 |
| Calcium Oxide (CaO) | 0.042 |

-continued

| TYPICAL COMPOSITION PROFILE Mean Percentage by Weight | |
|---|---|
| Titanium Dioxide (TiO$_2$) | 0.013 |
| Magnesium Oxide (MgO) | 0.011 |
| Potassium Oxide (K$_2$O) | 0.017 |
| Sodium Oxide (Na$_2$O) | 0.003 |
| Loss on Ignition (L.O.I.) | 0.101 |

In various embodiments, an aggregate comprising microcrystalline silica is used having a particle size distribution as follows:

| PARTICLE SIZE ANALYSIS Typical Mean % Retained on Individual Sieves | |
|---|---|
| Mesh (ASTM E-11) | % |
| 50 | 0.1 |
| 70 | 1.1 |
| 100 | 40.8 |
| 140 | 47.1 |
| 200 | 109 |
| 270 | TR |

Additionally, in various embodiments, the aggregate may comprise any structure or chemical species capable of or configured to transmit ultraviolet light or conducting electricity. This is particularly useful for use with clear hardening materials that can be cured by exposure to ultraviolet light.

Particles

In addition to the stabilizing filler and the aggregate, in various embodiments, a plurality of particles is added to the admixture. As discussed above, these particles may be added to the composite slurry for either functional and/or decorative utility.

In various embodiments, colored particles are added into the admixture and resulting composite slurry. In such embodiments, the chemical composition of the colored particles may include a polymer, a filler, and a pigment. Also in such embodiments, the polymer may comprise one or more of the following: an acrylic, polyvinyl acetate (PVA), polyvinyl chloride (PVC), polyester, polymethylmethacrylate, cellulosic resins, or methylmethacrylate (MMA). In addition, in various embodiments, specialty pigments may be used to produce colored particles that are fluorescent (black light activated), phosphorescent (glow-in-the-dark), and translucent (semi-transparent).

In various embodiments, the particles (colored or uncolored) may comprise one or more of any metal filing, mica, glitter, rubber, synthetic rubber such as ethylene propylene diene monomer (EPDM), colored quartz, crushed marble, or glass. In various embodiments, the particles (colored or uncolored) may comprise one or more of any organic material including, but not limited to, sea shells (like oysters or clams), cork, or walnut shells.

Additionally, in various embodiments, the particles may comprise any structure or chemical species capable of or configured to transmit ultraviolet light or conducting electricity. This is particularly useful for use with clear hardening materials that can be cured by exposure to ultraviolet light.

In various embodiments, the colored particles are color chips (also known as flakes or fleck) having a thickness ranging between about 1 mil to about 15 mils with irregular platform shapes generally encompassed within a circular area having a diameter ranging between about 1/64 inch to about 1/4 inch. In further embodiments, the colored particles are color chips (also known as flakes or fleck) having a thickness ranging between about 3 mil to about 10 mils. In still further embodiments, the colored particles are color chips (also known as flakes or fleck) having a thickness ranging between about 4 mils to about 6 mils.

Colored particles that are relatively thin (3 mils to 6 mils) are desired to produce coatings with a smooth surface. In accordance with various embodiments, thicker particles can be used if a rough surface finish is desired.

In various embodiments, the colored particles are suitable for use with any clear hardening material. Particularly, the colored particles may be suitable for use with, for example, one or more of epoxy, polyester, polyurethane, urethane, acrylic, polyurea, polyaspartic, polymethylmethacrylate, and methylmethacrylate (MMA).

In various embodiments, pigment may be added into the admixture and/or the resulting composite slurry, to color the overall composite slurry. In such embodiment, pigment may also include pigment(s) selected from a variety of materials. Pigment may be added in an amount effective to alter the coating or flooring material color from the unpigmented color, i.e. to achieve a desired color.

Clear Hardening Material

In various embodiments, once the admixture is created, it is then mixed with a clear hardening material. The clear hardening material may cure slowly and the solids may remain homogeneously suspended to allow sufficient working time (for example, approximately about 20 to about 30 minutes) required to distribute (e.g., trowel) the composite slurry evenly while facilitating multiple batch applications of the composite slurry. In this manner, large surface areas are coated without leaving seams, discontinuities, or surface irregularity (e.g., undulations) as subsequent batch applications of the slurry adjoin, abut, and otherwise interact with previously applied applications.

The clear hardening material comprises any polymeric material capable of polymeric cross linking to form a hardened or cured matrix. In various embodiments, the clear hardening material comprises a polymeric material (also referred to as a synthetic resin), wherein the polymeric material comprises at least one of an ester compound, a urethane compound, an acrylic compound, a urea compound, an aspartic compound, a methylmethacrylate (MMA) compound, and/or an epoxy compound. However, any polymeric material known or unknown in the art that would provide for a clear medium to integrate the admixture described herein and that will cure to form a seamless, durable coating is contemplated herein.

In various embodiments, the clear hardening material comprises a multiple component system such that when mixed with a hardener component, the clear hardening material cures as the result of an exothermic reaction or cures where stimulated with ultraviolet light.

In various embodiments, the hardener may include any chemical species capable of initiating polymer cross linking, or a polymeric reaction. Examples of some potential hardeners include methyl diisocyanate, triethyl diisocyanate, methyl ethyl ketone peroxide, diethylene triamine, triethylene tetramine, tetra ethylene pentamine and/or cycloaliphatic amines.

In various embodiments, the clear hardening material may comprise a water based epoxy. Water based epoxies may appear opaque or translucent during application, but cure to be at least partially transmissive to visible light. In such embodiments, cured water based epoxies create porous coatings that may reduce or eliminate the need for the application of a primer or other vapor barrier to a substrate.

Methods of Application

There are two primary types of seamless surface coating materials and applications. The first is a mortar type system wherein rock or particles may be mixed with a castable liquid and cured on a surface, or, in the alternative, wherein a castable liquid may be troweled on a surface and a rock or particle may be broadcast across the surface and cured.

The second type of seamless surface coating materials is a particle or chip broadcast system. In both of types of seamless surface coating materials, a surface is prepped either mechanically (i.e. sanding, grinding, shot blasting, planing, etc.) or chemically (i.e. with an acid etch, etc). The prepped surface may then be coated with a suitable primer or other vapor barrier. In the mortar-type system, a castable material with rock or particles mixed is then applied to a surface, though is typically of such high solids content that the material is not self leveling. This results in a surface with exposed particles or rock and a rough uneven surface. Thus, this mortar-type system requires iterative grinding and top coats to provide a uniform and desirable surface profile, which tends to be labor intensive.

In the particle or chip broadcast system, after substrate/surface preparation, a liquid polymer is applied to the substrate. Particles (chips or rock) are broadcast into the liquid and the combination is allowed to cure. Thereafter, the surface is scraped to remove excess particles and a top coat is applied to provide a desired surface profile. Again, this process is labor intensive.

Thus, there is a need in this field for a composite slurry composition for use in seamless surface coverings that provides for a level surface without substantial preparatory work to the underlying substrate and eliminates multiple application steps to provide a desired surface profile.

In various embodiments, the admixture comprising a plurality of particles, a stabilizing filler, and an aggregate may be mixed with a polymeric material to form a precursor composite slurry with a uniform suspension of particles. Stated another way, in accordance various embodiments, the admixture comprising a plurality of particles, a stabilizing filler, and an aggregate may be mixed with the polymeric material of a two component synthetic resin system. This allows for the shipping and handling of the precursor composite slurry prior to adding the chemical hardener, as discussed herein, to from the final composite slurry. Thus, in accordance with various embodiments, the precursory composite slurry would not harden or cure until the installer was ready to apply the composite to a surface.

Additionally, one may produce and sell an admixture comprising a plurality of particles, a stabilizing filler, and an aggregate that is intended to be mixed with a single or multiple component polymeric system that hardens or cures to provide a seamless surface covering. Similarly, one may produce and sell an admixture comprising a plurality of particles, a stabilizing filler, and an aggregate that has been mixed with any polymeric material, such as a single component polymer system, wherein the admixture/polymer material precursor composite slurry will, in turn, be activated prior to application.

In various embodiments, the various composite slurries disclosed herein allow for application of a material that already contains particles, decorative or functional, in any manner wherein the applied force of the application tool is substantial parallel to the finished surface of the cured composite. For example, the application tool, in various embodiments, may be a rake. More specifically, the rake may comprise an elongated handle and a troweling surface configured to be used by pulling the rake across composite slurry applied to a surface. For example, this rake may be a steel rake about 18 to about 24 inches across or any tool configured to provide an even coat of the composite slurry on a surface, wherein said coat of composite slurry may be about 30 mils to about 80 mils thick.

In various embodiments, as discussed above, the coat of composite slurry may be about 40 to about 90 mils thick. Following the initial application and the distribution of composite slurry on a surface, a loop roller may be used to move material (as particles remain suspended) to finely adjust, level, and distribute the composite surface coating.

The following examples are intended to provide exemplary embodiments of various composite slurry compositions and in no way limit the scope and breadth of the present disclosure.

EXAMPLE 1

Example 1 illustrates an admixture comprising fiber as the only stabilizing filler.

Admixture (% by Weight)

| | |
|---|---|
| Colored Particles "E" size color chip blend produced by Chips Unlimited, Inc. (B99-220E) | 35% |
| Micro-Glass Milled Fiber Average fiber diameter = 16 microns. Average fiber length = 220 microns | 20% |
| Microcrystalline Silica An exemplary chemical analysis and particle size analysis is provided above. | 45% |

Admixture & Synthetic Resin Combination

| | |
|---|---|
| Clear Synthetic Liquid Resin Epoxy (2 parts A:1 part B). Activated viscosity = approx. 400 CP | |
| Combined Resin (Epoxy)/Admixture (v:v) | 1.125/1.00 |

EXAMPLE 2

Example 2 illustrates an admixture comprising vitreous calcium aluminosilicate and fiber as the stabilizing filler.

Admixture (% by Weight)

| | |
|---|---|
| Colored Particles "E" size color chip blend produced by Chips Unlimited, Inc. (B99-220E) | 33% |
| Micro-Glass Milled Fiber Average fiber diameter = 16 microns. Average fiber length = 220 microns. | 11% |
| Vitreous Calcium Aluminosilicate Average particles size = approx. 12 microns. 95% passing through 325 mesh. | 13% |
| Microcrystalline Silica An exemplary chemical analysis and particle size analysis is provided above. | 43% |

Admixture & Synthetic Resin Combination

Clear Synthetic Liquid Resin
Epoxy (2 parts A:1 part B). Activated viscosity = approx. 400 CP
Combined Synthetic Resin (Epoxy)/Admixture (v:v)   1.00/1.00

EXAMPLE 3

Example 3 illustrates an admixture comprising a glitter particle.

Admixture (% by Weight)

| | |
|---|---|
| Colored Particles<br>99% (by weight) "E" size color chip blend produced by Chips Unlimited, Inc. (B99-220E) combined with 1% (by weight) MV1 silver (regular) glitter. | 33% |
| Micro-Glass Milled Fiber<br>Average fiber diameter = 16 microns. Average fiber length = 220 microns. | 11% |
| Vitreous Calcium Aluminosilicate<br>Average particles size = approx. 12 microns. 95% passing through 325 mesh. | 13% |
| Microcrystalline Silica<br>An exemplary chemical analysis and particle size analysis is provided above. | 43% |

Admixture & Synthetic Resin Combination

| | |
|---|---|
| Clear Synthetic Liquid Resin<br>Epoxy (2 parts A:1 part B). Activated viscosity = approx. 400 CP | |
| Combined Synthetic Resin (Epoxy)/Admixture (v:v) | 1.00/1.00 |

EXAMPLE 4

Example 4 illustrates an admixture comprising multiple particles with different dimensions to provide a multi-grain aesthetic.

Admixture (% by Weight)

| | |
|---|---|
| Colored Particles<br>Color chips produced by Chips Unlimited, Inc. - 50% (by weight) C600E (white) "E" size + 46% C610E (black) "E" size + 4% C61014 (black) ¼ inch. | 33% |
| Micro-Glass Milled Fiber<br>Average fiber diameter = 16 microns. Average fiber length = 220 microns. | 11% |
| Vitreous Calcium Aluminosilicate<br>Average particles size = approx. 12 microns. 95% passing through 325 mesh. | 13% |
| Microcrystalline Silica<br>An exemplary chemical analysis and particle size analysis is provided above. | 43% |

Admixture & Synthetic Resin Combination

| | |
|---|---|
| Clear Synthetic Liquid Resin<br>Epoxy (2 parts A:1 part B). Activated viscosity = approx. 400 CP | |
| Combined Synthetic Resin (Epoxy)/Admixture (v:v) | 1.00/1.00 |

EXAMPLE 5

Example 5 illustrates an admixture comprising glow-in-the-dark particles.

Admixture (% by Weight)

| | |
|---|---|
| Colored Particles<br>Color chips produced by Chips Unlimited, Inc. - 50% (by weight) C600E (white) "E" size + 46% C610E (black) "E" size + 4% C27-80214 (Green Glow) ¼ inch. | 33% |
| Micro-Glass Milled Fiber<br>Average fiber diameter = 16 microns. Average fiber length = 220 microns. | 11% |
| Vitreous Calcium Aluminosilicate<br>Average particles size = approx. 12 microns. 95% passing through 325 mesh. | 13% |
| Microcrystalline Silica<br>An exemplary chemical analysis and particle size analysis is provided above. | 43% |

Admixture & Synthetic Resin Combination

| | |
|---|---|
| Clear Synthetic Liquid Resin<br>Epoxy (2 parts A:1 part B). Activated viscosity = approx. 400 CP | |
| Combined Synthetic Resin (Epoxy)/Admixture (v:v) | 1.00/1.00 |

EXAMPLE 6

Example 6 illustrates an admixture comprising glitter particles only.

Admixture (% by Weight)

| | |
|---|---|
| Colored Particles<br>MV1 (regular) glitter from Chips Unlimited, Inc. | 4% |
| Micro-Glass Milled Fiber<br>Average fiber diameter = 16 microns. Average fiber length = 220 microns. | 16% |
| Vitreous Calcium Aluminosilicate<br>Average particles size = approx. 12 microns. 95% passing through 325 mesh. | 19% |
| Microcrystalline Silica<br>An exemplary chemical analysis and particle size analysis is provided above. | 61% |

Admixture & Synthetic Resin Combination

| | |
|---|---|
| Clear Synthetic Liquid Resin<br>Epoxy (2 parts A:1 part B). Activated viscosity = approx. 400 CP | |
| Combined Synthetic Resin (Epoxy)/Admixture (v:v) | 1.00/1.00 |

The present inventions have been described above with reference to a number of exemplary embodiments. It should be appreciated that the particular embodiments shown and described herein are illustrative of the invention and its best mode and are not intended to limit in any way the scope of the inventions. Those skilled in the art having read this disclosure will recognize that changes and modifications may be made to the exemplary embodiments without departing from the scope of the present inventions. For example, while the compositions, systems, and methods of manufacture contemplated in the present inventions are illustrated with examples of preferred embodiments directed to seamless floor coating applications, without limitation, the present inventions are suitable for use as any surface coating. Although certain aspects of the inventions are described herein in terms of exemplary embodiments, such aspects of the inventions may be achieved through any number of suitable means now known or hereafter devised. Accordingly, these and other changes or modifications are intended to be included within the scope of the present inventions.

What is claimed is:

1. A composition comprising:
   a clear hardening material;
   a plurality of particles;
   a stabilizing filler comprising micro-glass milled fiber; and
   an aggregate comprising microcrystalline silica, such that the aggregate and the stabilizing filler cooperate to provide uniform suspension of said plurality of particles,
   wherein the aggregate is between 43% and 61% by weight of the plurality of particles, the aggregate and the stabilizing filler, wherein the plurality of particles is between 4% and 35% by weight of the plurality of particles, the aggregate and the stabilizing filler, and wherein the stabilizing filler is between 20% and 35% by weight of the plurality of particles, the aggregate and the stabilizing filler.

2. The composition of claim 1, wherein said stabilizing filler and said aggregate have a refractive index ranging between 1.5 and 1.6 when wetted by said clear hardening material.

3. The composition of claim 1, wherein said stabilizing filler further comprises vitreous calcium aluminosilicate.

4. The composition of claim 1, wherein said micro-glass milled fiber has an average diameter of about 10 microns to about 20 microns.

5. The composition of claim 1, wherein said micro-glass milled fiber has an average fiber length of about 100 microns to about 300 microns.

6. The composition of claim 1, wherein said micro-glass milled fiber has an average aspect ratio of about 10:1 to about 20:1.

7. The composition of claim 1, wherein ratio of a volume of the plurality of particles, the aggregate and the stabilizing filler to a volume of clear hardening material is about 0.5:1.0 to about 1.5:1.0.

8. The composition of claim 1, wherein said clear hardening material comprises polymeric material that is capable of hardening.

9. The composition of claim 8, wherein said polymeric material comprises at least one of a single component system, wherein no additional chemical hardener is needed to harden said polymeric material, or a two component system, wherein a chemical hardener is needed to harden said polymeric material.

10. The composition of claim 9, wherein said chemical hardener cures as the result of at least one of an exothermic reaction or a reaction with ultraviolet light.

11. The composition of claim 8, wherein said polymeric material comprises at least one of an ester compound, a urethane compound, an acrylic compound, a urea, an aspartic compound, a methylmethacrylate compound, and an epoxy compound.

12. The composition of claim 8, wherein said polymeric material has a viscosity of about 300 cP about 800 cP.

* * * * *